(12) United States Patent
Snyder

(10) Patent No.: US 9,803,485 B2
(45) Date of Patent: Oct. 31, 2017

(54) TURBINE SEGMENTED COVER PLATE RETENTION METHOD

(71) Applicant: Rolls-Royce North American Technologies, Inc., Indianapolis, IN (US)

(72) Inventor: Brandon R. Snyder, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 635 days.

(21) Appl. No.: 14/103,106

(22) Filed: Dec. 11, 2013

(65) Prior Publication Data

US 2014/0356177 A1 Dec. 4, 2014

Related U.S. Application Data

(60) Provisional application No. 61/773,091, filed on Mar. 5, 2013.

(51) Int. Cl.
*F01D 5/30* (2006.01)
*F01D 5/32* (2006.01)
*B23P 15/04* (2006.01)

(52) U.S. Cl.
CPC ............ *F01D 5/3015* (2013.01); *B23P 15/04* (2013.01); *F01D 5/326* (2013.01); *F05D 2230/60* (2013.01); *Y10T 29/49321* (2015.01)

(58) Field of Classification Search
CPC .................. F01D 5/3015; F01D 5/326
See application file for complete search history.

(56) References Cited

U.S. PATENT DOCUMENTS

| 3,656,865 A | 4/1972 | Spears, Jr. |
| 3,807,898 A * | 4/1974 | Guy ............ F01D 5/3015 416/218 |
| 3,853,425 A | 12/1974 | Scalzo et al. |
| 4,019,833 A | 4/1977 | Gale |
| 4,108,571 A * | 8/1978 | Mawson ............ F01D 5/3015 416/221 |
| 4,648,799 A | 3/1987 | Brown et al. |
| 5,256,035 A | 10/1993 | Norris et al. |
| 5,320,492 A | 6/1994 | Bouru et al. |

(Continued)

FOREIGN PATENT DOCUMENTS

| EP | 1498579 A1 | 1/2005 |
| GB | 2268979 A | 1/1994 |

OTHER PUBLICATIONS

International Search report PCT/US2013/074499 mailed on Sep. 23, 2014.

*Primary Examiner* — Gregory Anderson
*Assistant Examiner* — Juan G Flores
(74) *Attorney, Agent, or Firm* — Fishman Stewart PLLC

(57) ABSTRACT

An improved gas turbine cover plate assembly is disclosed for use in connection with segmented cover plates in turbine configurations where it is not possible to stagger the blades to create assembly clearance. The improved turbine assembly also avoids cover plate loading slots in the disc which can cause high stress features. The improved system also includes a method to axially retain segmented cover plates in relation to a turbine disc using a segmented retainer ring.

19 Claims, 3 Drawing Sheets

(56) References Cited

U.S. PATENT DOCUMENTS

| | | | |
|---|---|---|---|
| 5,525,429 A * | 6/1996 | Mannava | B23K 26/00 |
| | | | 148/525 |
| 5,622,475 A | 4/1997 | Hayner et al. | |
| 6,106,234 A | 8/2000 | Gabbitas | |
| 6,520,743 B2 | 2/2003 | Arilla et al. | |
| 6,884,028 B2 | 4/2005 | Brauer et al. | |
| 7,238,008 B2 | 7/2007 | Bobo et al. | |
| 7,264,447 B2 | 9/2007 | Ono et al. | |
| 7,597,499 B2 | 10/2009 | Udall | |
| 8,096,776 B2 | 1/2012 | Bluck et al. | |
| 8,105,041 B2 | 1/2012 | Brillert et al. | |
| 8,128,371 B2 | 3/2012 | Ravi et al. | |
| 8,128,374 B2 | 3/2012 | Boeck | |
| 8,206,119 B2 | 6/2012 | Liotta et al. | |
| 8,226,366 B2 | 7/2012 | Brucher et al. | |
| 8,348,620 B2 | 1/2013 | Dejaune et al. | |
| 2004/0062643 A1 | 4/2004 | Brauer et al. | |
| 2006/0188377 A1 | 8/2006 | Dixon et al. | |
| 2009/0092497 A1 * | 4/2009 | Boeck | F01D 5/3015 |
| | | | 416/220 R |
| 2012/0034087 A1 | 2/2012 | Dungs et al. | |

* cited by examiner

TURBINE SEGMENTED COVER PLATE RETENTION METHOD

CROSS-REFERENCE TO RELATED APPLICATIONS

This application claims priority to U.S. Provisional Patent Application No. 61/773,091, filed Mar. 5, 2013, the contents of which are hereby incorporated in their entirety.

GOVERNMENT RIGHTS

This disclosure was made with government support under FA8650-07-C-2803 awarded by the United States Air Force. The government has certain rights in the disclosure.

FIELD OF TECHNOLOGY

An improved gas turbine engine, and more particularly, a method and apparatus for retaining segmented cover plates to a bladed turbine disc in a gas turbine engine.

BACKGROUND

Gas turbine engines employ turbine rotors that have a rotor body as well as a plurality of rotor blades that rotate therewith. The rotor blades may be an integral part of the rotor body or they may be separately anchored by a blade root that is positioned in one or a plurality of axially extending grooves of the rotor body. Rotors that have blades that are integral to the rotor body have certain draw backs in view of their unitary design. As such, some aerospace applications have preferred turbine rotors that have rotor blades that are individually anchored to the rotor body by employing axially extending grooves in the rotor body that are operable to receive the blade roots of the rotor blade. Retaining members known as cover plates have been employed to secure the rotor blades axially relative to the rotor body. However, a challenge with such designs is the ease of installing and then maintaining the rotor blades after they have been in service.

Prior methods for retaining a gas turbine blade relative to the rotor or disc body utilize segmented cover plates that require slots to be cut into a groove of the rotor body to allow the cover plates to slide into place, or the blades must be staggered during assembly to create clearance. Slots in the rotor body groove can create high stress areas and my not be a helpful feature. Retention methods utilizing locking wires below the segmented cover plates require machined segmented cover plates which are heavier and more expensive than conventional formed sheet metal segmented cover plates.

Segmented cover plates that are held in place by grooves in the bottom of the blade platforms use a locking wire which interfaces with a groove in the radially inward edge of the cover plates and a groove in the disc. This method requires machined segmented cover plates in order to create the groove for the locking wire. It would be helpful to provide an improved segment cover plate that is formed from sheet metal which is inexpensive and lighter than machined cover plates. A new method of installing the segmented cover plate for retaining a rotor blade axially relative to a rotor body would also be helpful.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An improved method is disclosed to axially retain segmented cover plates in relation to a turbine disc using a segmented retainer ring. Segmented cover plates are provided which are retained at their radially outward edge by grooves in the underside of the blade platform. The cover plates are axially retained at their radially inward edge by retainer ring segments which are inserted below each cover plate segment in groove in the disc. Segmented cover plates known as smash plates are also used and they do not require retainer ring segments. This arrangement allows the segmented cover plates to be assembled with the bladed disc without cover plate loading slots in the disc or staggering the blades to create assembly clearance.

The improved system allows the use of segmented cover plates in turbine configurations where it is not possible to stagger the blades to create assembly clearance. The improved system also avoids cover plate loading slots in the disc which can be high stress features. The improved system includes a method to axially retain segmented cover plates in relation to a turbine disc using a segmented retainer ring.

Figure 1:
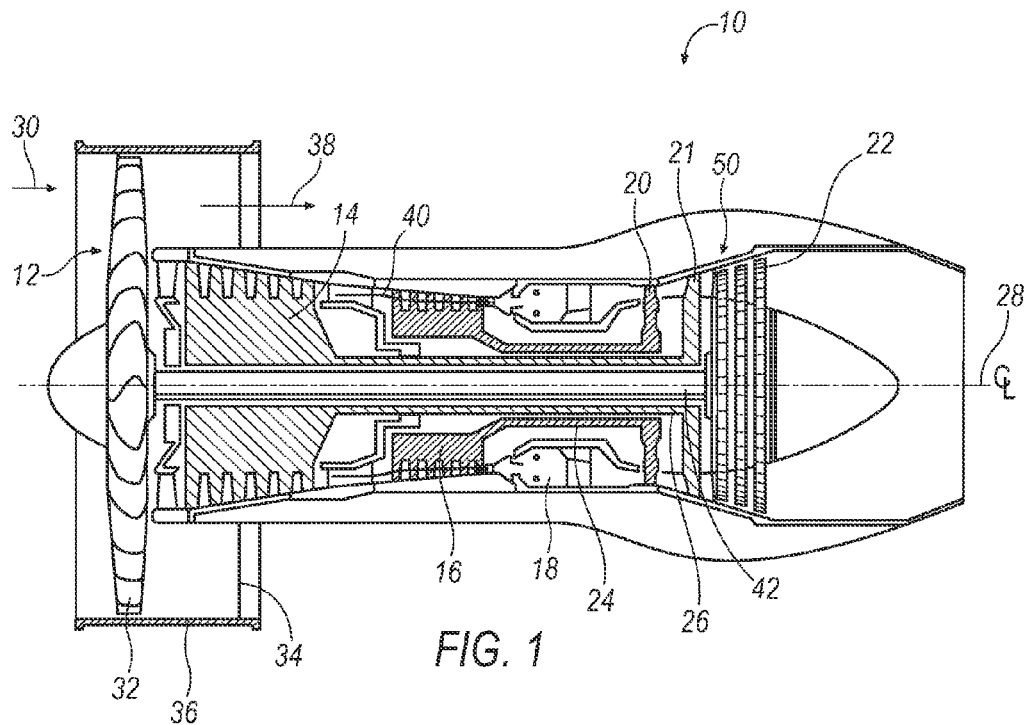
FIG. 1 illustrates a schematic view of a gas turbine engine.

FIG. 1 illustrates a gas turbine engine 10, which includes a fan 12, an intermediate pressure compressor and a high pressure compressor, 14 and 16, a combustor 18, a high pressure turbine, an intermediate pressure turbine, and a low pressure turbine, 20 and 21 and 22, respectively. The high pressure compressor 16 is connected to a first rotor shaft 24 while the intermediate pressure compressor 14 is connected to a second rotor shaft 26 and the fan is connected to a third rotor shaft 42. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved turbine segmented cover plate assembly 50 and method of installation for axially retaining turbine blades to a body of a turbine disc.

Figure 2:
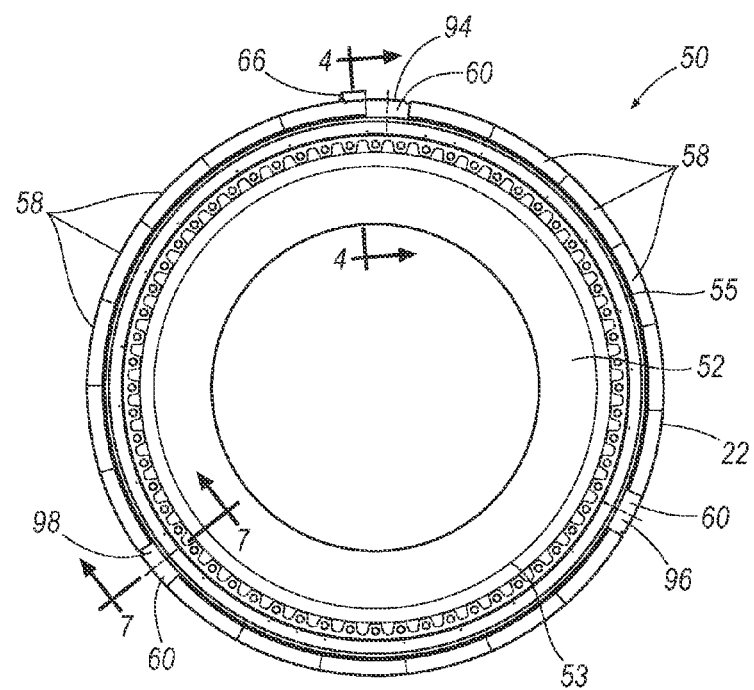
FIG. 2 illustrates a side view of a gas turbine rotor assembly as shown in FIG. 1, but with the rotor blades removed.

FIG. 2 illustrates a front view of the low pressure turbine 22 assembly employing the improved turbine segmented cover plate assembly 50 along with the turbine blades and a turbine disc. It will be appreciated that the cover plate assembly 50 may be employed with the high pressure and intermediate pressure turbines, 20, 21. For demonstrative purposes only, a discussion of the cover plate assembly 50 will be presented in the context of the low pressure turbine 22.

Figure 3:
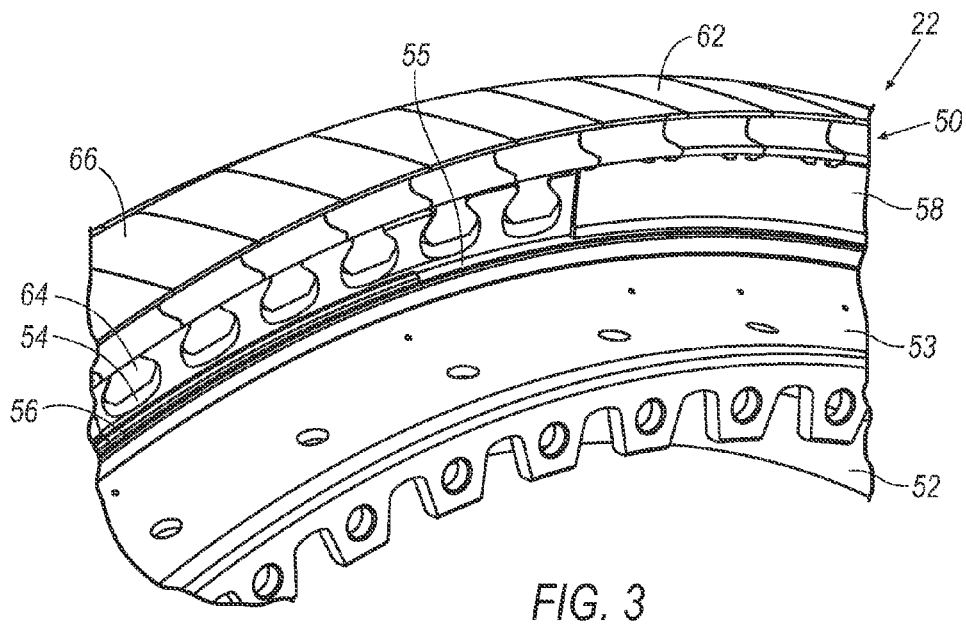
FIG. 3 illustrates a perspective view of the turbine blades assembled to a disc, and the cover plate shown in position.

With reference to FIGS. 2 and 3, the turbine 22 includes a disc 52 having a disc body 53, an annular groove 55 that circumscribes the body 53, a segmented retainer ring or clip 56 slideably positioned within the groove 55, a cover plate or locking member 58, smash plates 60, and turbine blades 62. Exemplary smash plates 60 are located at the 12 o'clock, 4 o'clock and 8 o'clock positions. It will be appreciate that more or less smash plates 60 may be used with the turbine 22 assembly and they may be positioned at alternative locations. The segmented ring(s) 56 are approximately the same length as the segmented cover plate(s). It will be appreciated that each cover plate 58 has a width encompassing about four blade plat forms 66, however the width could be more or less. The segmented cover plates 58 and segmented ring 54 are arcuate shaped in the side profile and have a similar geometric configuration and length.

The disc body 53 of the turbine 22 includes a plurality of axially extending grooves 54 that are circumferentially spaced about the perimeter of the body 52. The grooves 54 are configured to receive a blade root 64 of each rotor blade 62. The blade root 64 leads into a blade platform 66 which in turns is the base in which the aerodynamic rotor blades (not shown) are supported. Each blade 62 is operable to slide axially relative to the corresponding axial groove 54, and they are axially retained in place by the combination of the retainer clip 56 and the cover plate 58.

Figure 4:
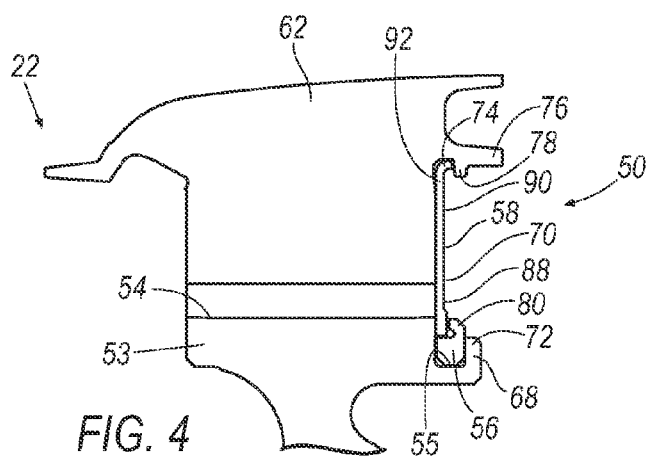
FIG. 4 illustrates an enlarged sectional view taken from arrow 4-4 of FIG. 2, showing a segmented cover plate assembly installed in the disc, with the cover plate and retainer clip locked in place.

FIG. 4 illustrates the cover plate assembly 50 retaining the blade 62 relative to the disc 52. The body 53 of the disc 52 includes the circumferentially spaced annular groove 55 that is positioned in a retaining arm 68 that extends from a face 70 of the assembly 50. The retaining arm 68 includes a radially extending portion 72 that extends opposite the direction of the centerline 28 of the machine 10. Distally opposed from the groove 55 is another annular groove 74 that extends circumferentially around the blade 62. The groove 74 is located in an inner shroud 76 that too extends circumferentially around the blade 62. A tab 78 radially extends towards the disc 52 and aids to retain an upper portion of the cover plate 58 in place.

The retainer clip 56 impinges upon the surface 88 of the cover plate 58 such that once it is installed within groove 55, the cover plate 58 and the clip 56 bias the blade 62 axially in the groove 54 so that the blade 62 is firmly secured in place. The retainer clip 56 has a main body 82, an upwardly extending arm 84, and a notched portion 86. While an exemplary L-shaped clip is depicted, it will be appreciated that other shaped configurations may be employed. The lower end 88 of the cover plate 58 is positioned within the notch 86 which firmly positions the lower end 88 of the cover plate 58. The cover plate 58 and the clip 56 may be constructed of high temperature steel or other material as long as it withstands gas turbine rotor operating conditions.

The cover plate 58 is substantially flat and has a central portion 90, the lower portion 88, and an upper portion 92 which includes an arcuate member for being received within the groove 74. It will be appreciated that the disc 52 and the blades 62 are constructed of materials that are known in the gas turbine industry.

Figure 5:
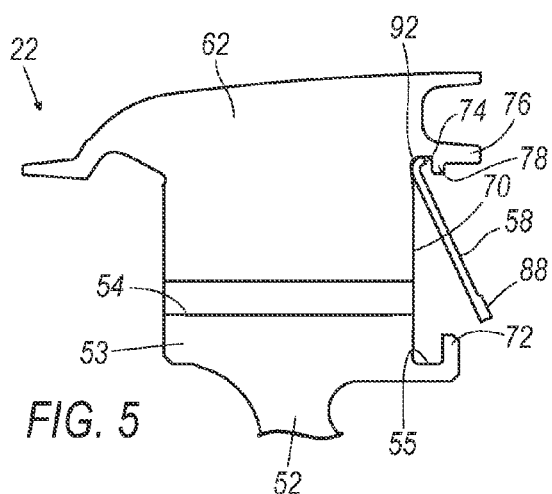
FIG. 5 illustrates a step showing the cover plate being inserted within the groove of the rotor blade body.

The method of installing a cover plate assembly 50 will now be described. With reference to FIG. 5, the blade 62 has been positioned relative to the disc wheel 52 so that the face 70 of each structure is substantially in alignment. This is accomplished by axially sliding the blade 62 within the groove 54 of the disc 52 to a point where the faces 70 are flush. The next step includes the upper portion 92 of the cover plate 58 being located within the groove 74. The lower end 88 of the cover plate 58 may then be advanced towards the face 70 to a position shown in FIG. 6. The lower end 88 of the cover plate 58 clears the radially extending member 72 of the retaining arm 68. The cover plate 58 rests against the face 70.

Figure 6:
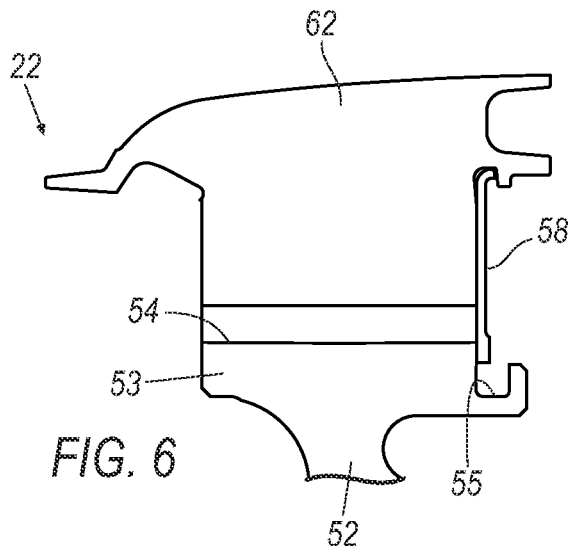
FIG. 6 illustrates a step showing the cover plate fully positioned in place relative to the groove of the blade and disc.

FIG. 6 shows the cover plate 58 properly in a position ready for the retainer clip 56 to be installed. The retainer clip 56 secures the cover plate 58 in position at the locations where a smash plate 60 is not employed.

For the next step, with reference back to FIG. 4, the retainer clip 56 is now slid in place within groove 55 so as to sandwich the lower end 88 of the cover plate 58 against the face 70. This arrangement axially retains the blade 62 within the groove 54 and maintains the disc 52 and blade 62 relative to one another. The next step includes installing the smash plate members 60 in place relative to the turbine body 53.

Figure 7:
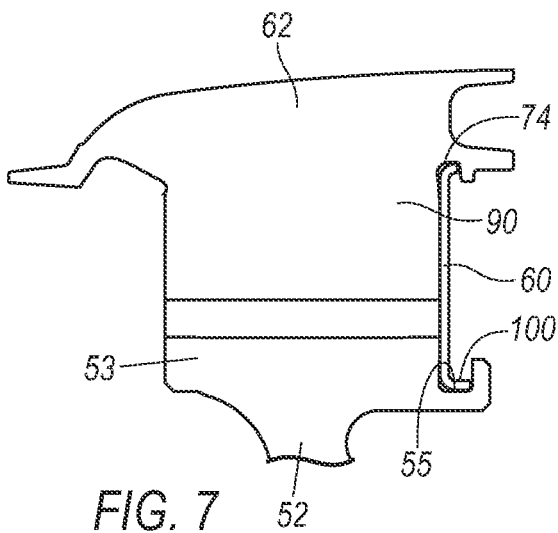
FIG. 7 illustrates an enlarged sectional view taken from arrow 7-7 of FIG. 2, showing the smash plate installed in the turbine assembly.
Figure 8:
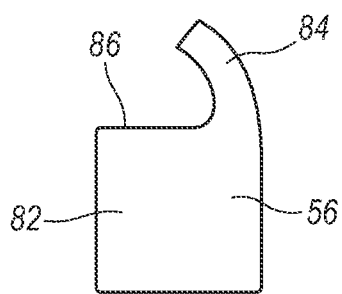
FIG. 8 is a side view of a segmented retainer clip or ring that is utilized in the novel assembly.

FIG. 7, which is a sectional view taken from arrow 7-7 of FIG. 2, depicts a smash plate 60 being positioned within sections 94, 96 and 98 of the turbine body 52. See FIG. 2. For illustrative purposes only a section cut is shown through section 98. However, similar sections are present at sections 94 and 96. The smash plate 60 is c-shaped in the end profile and is located within grooves 74 and 55 and the lower end of the smash plate 60 has an axially extending lip 100 that consumes a substantial portion of the groove 55. Each smash plate 60 is a metallic member that is operable to be forced into position as shown in FIG. 7.

During operation of the machine 10, the clip 56 and cover plate 58 collectively aid to hold the blades 62 in place and reduce fluid leakage within the system 10. Likewise the smash plates 60 retain the adjacent blades 62 and disc 52 in position.

To remove a blade 62 from the turbine assembly 22, the inverse of the aforementioned steps is employed. In particular, one or more of the smash plates 60 are removed. This clears the path for the retaining clip 56 to be clocked or rotated towards an open space or void that has been created as a result of the smash plate(s) 60 being removed. It will be appreciated that one or more of the smash plates 60 may be removed for this process depending on the circumstances as hand.

Now that a void has been created by the removal of a smash plate 60, retainer clip 56 may be clocked towards the void which permits the clip 56 to be slid out of the groove 55. This action clears the way for the cover plate 58 to be rotated out, for example as is shown in FIG. 5, so as to remove the clip 56 from the turbine assembly 22. Once the plate 58 has been removed, the blade 62 likewise is free to be axially slid apart from the disc 52. To re-install the blade 62 or install a new blade 62, the inverse of the aforementioned steps may be employed.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine disc and cover plate assembly comprising:
   a turbine disc having a first groove and a retaining arm including a radially extending portion;
   a turbine blade having a second groove;
   at least one segmented cover plate having an upper end and a lower end, the at least one segmented cover plate dimensioned such that when the upper end is positioned within the second groove the lower end clears the first groove;
   at least one retainer member positioned within the first groove of the turbine disc below the lower end of the segmented cover plate such that the at least one retainer member is positioned against the bottom of the first groove and the radially extending portion, the retainer member having a contact surface comprising a notched portion for retaining the lower end of the segmented cover plate in place relative to the turbine disc such that the segmented cover plate is secured between the first groove and the second groove; and
   at least one smash plate positioned within the first groove of the turbine disc;
   wherein axial retention of the turbine blade relative to the turbine disc is aided by the smash plate; and
   wherein the notched portion is configured to force the at least one segmented cover plate into the second groove and inwards against the turbine blade.

2. The gas turbine engine disc and cover plate assembly as claimed in claim 1, wherein the turbine disc includes an axially extending groove, said axially extending groove extends axially and is operable to receive a portion of the turbine blade.

3. The gas turbine engine disc and cover plate assembly as claimed in claim 1, wherein the first groove extends circumferentially substantially around a perimeter of the disc.

4. The gas turbine engine disc and cover plate assembly as claimed in claim 1, wherein the retainer member extends below the lower surface of the segmented cover plate such that the segmented cover plate and the retainer member consume substantially all of the space that exists within the first groove of the turbine disc.

5. The gas turbine engine disc and cover plate assembly as claimed in claim 1, wherein the smash plate is collapsible between a first position and a second position.

6. The gas turbine engine disc and cover plate assembly as claimed in claim 1, wherein the retaining member is a segmented ring, the segmented ring and cover plate operate to secure the blade and disc relative to one another.

7. The gas turbine engine disc and cover plate assembly as claimed in claim 1, wherein a plurality of retaining members are positioned a various locations about a circumference of the assembly.

8. The gas turbine engine disc and cover plate assembly as claimed in claim 1, wherein the notched portion is arcuate shaped.

9. The gas turbine engine disc and cover plate assembly as claimed in claim 1, wherein the upper end of the at least one segmented cover plate comprises an arcuate portion positioned within the second groove, the arcuate portion cooperating with the at least one retainer member to generate the inward force.

10. A disc and cover plate assembly for a turbo machine comprising:
    a turbine disc having a first groove and a retaining arm including a radially extending portion;
    at least one cover plate having an upper end and a lower end;
    a turbine blade having a second groove; and
    at least one segmented retainer member positioned within the first groove of the disc and extending below the lower end of the cover plate such that the at least one segmented retainer member is positioned against the bottom of the first groove and the radially extending portion, the segmented retainer member having a contact surface comprising a notched portion for retaining the cover plate in place relative to the turbine disc;
    wherein a combined dimension of the cover plate and the at least one segmented retaining member comprise a length between a first groove and the second groove; and
    wherein the notched portion is configured to force the at least one cover plate into the second groove and inwards against the turbine blade.

11. The disc and cover plate assembly as claimed in claim 10, further comprising a smash plate that is positioned within the first groove of the disc.

12. The disc and cover plate assembly as claimed in claim 10, wherein axial retention of the turbine blade relative to the turbine disc is aided by a smash plate.

13. The disc and cover plate assembly as claimed in claim 10, wherein the segmented retaining member is a ring.

14. The disc and cover plate assembly as claimed in claim 10, wherein the segmented retaining member is L-shaped in the end view.

15. The disc and cover plate assembly as claimed in claim 10, wherein the cover plate is segmented.

16. The disc and cover plate assembly as claimed in claim 10, further comprising a plurality of cover plates and segmented retaining members that are positioned around the perimeter of the assembly.

17. The disc and cover plate assembly as claimed in claim 10, further comprising a gas turbine engine.

18. A method of assembling a cover plate to a gas turbine engine disc comprising the steps of:
    a. providing a disc including a disc groove and a retaining arm including a radially extending portion;
    b. providing at least one segmented cover plate;
    c. providing a blade including a blade groove;
    d. providing at least one segmented retainer ring;
    e. providing at least one smash plate;
    f. inserting one segmented cover plate into place within the blade groove, the segmented cover plate dimensioned to clear the disc groove;
    g. inserting a segmented retainer ring into the disc groove adjacent to the segmented cover plate such that the segmented retainer ring is positioned against the bottom of the disc groove and the radially extending portion;

h. sliding the segmented retainer ring into a position beneath a lower end of the segmented cover plate such that the segmented cover plate is secured between the disc groove and the blade groove by engaging a notched portion of the segmented retainer ring, the notched portion configured to force the segmented cover plate into the blade groove and inwards against the blade;

i. continuing inserting segmented cover plates and segmented retainer rings until a predetermined number of spaces for segmented cover plates remain;

j. arranging the cover plates and segmented retainer rings such that the predetermined number of open spaces that remain are located to a preferred location; and k. inserting a smash plate in each open space.

19. The method of assembling a cover plate to a gas turbine engine disc as claimed in claim 18, further comprising the step of removing smash plates, removing the segmented retainer ring and removing the cover plate.

* * * * *